US012018450B2

(12) United States Patent
Niroumand

(10) Patent No.: US 12,018,450 B2
(45) Date of Patent: Jun. 25, 2024

(54) MANDREL FOR SOIL COMPACTION

(71) Applicant: Bahman Niroumand, Boushehr (IR)

(72) Inventor: Bahman Niroumand, Boushehr (IR)

( * ) Notice: Subject to any disclaimer, the term of this patent is extended or adjusted under 35 U.S.C. 154(b) by 342 days.

(21) Appl. No.: 17/390,991

(22) Filed: Aug. 1, 2021

(65) Prior Publication Data

US 2021/0355648 A1 Nov. 18, 2021

Related U.S. Application Data

(60) Provisional application No. 63/059,983, filed on Aug. 1, 2020.

(51) Int. Cl.
*E02D 3/054* (2006.01)
*B25D 1/02* (2006.01)

(52) U.S. Cl.
CPC ............... *E02D 3/054* (2013.01); *B25D 1/02* (2013.01); *B25D 2250/025* (2013.01)

(58) Field of Classification Search
CPC .. E02D 3/054; E02D 5/34; E02D 5/30; E02D 7/02; B25D 1/02; B25D 2250/025; B25D 17/02; E21B 1/12; E21B 7/205
See application file for complete search history.

(56) References Cited

U.S. PATENT DOCUMENTS 844,294 A * 2/1907 Winslow ................... E02D 5/80 52/155
3,385,070 A * 5/1968 Jackson .................. E02D 5/385 264/32
4,239,419 A * 12/1980 Gillen, Jr. ................. E02D 5/56 405/253
4,889,451 A * 12/1989 Simanjuntak ............. E02D 5/44 405/232
5,249,892 A * 10/1993 Fox .......................... E02D 3/054 405/271
6,592,300 B2 * 7/2003 Yang ........................ E02D 5/385 405/253
7,488,139 B2 * 2/2009 Wissmann ................ E02D 3/08 405/271
8,920,077 B2 * 12/2014 Kruse ...................... E02D 27/26 405/244
9,487,965 B2 * 11/2016 Volin .................... F16B 5/0233
10,640,945 B1 * 5/2020 Niroumand ............... E02D 5/44
10,669,687 B1 * 6/2020 Niroumand ............. E02D 29/02
(Continued)

FOREIGN PATENT DOCUMENTS

CN 104533292 A * 4/2015 ............... E02D 5/36
CN 112832238 A * 5/2021 ............... E02D 5/30
KR 20200002585 U * 11/2020 ............. E02D 27/10

*Primary Examiner* — Hemant Desai
*Assistant Examiner* — Mobeen Ahmed
(74) *Attorney, Agent, or Firm* — Bajwa IP Law Firm; Haris Zaheer Bajwa

(57) ABSTRACT

A mandrel for forming a cavity at a target location. The mandrel includes a base part positioned at a top end of the mandrel, a first middle part, a second middle part, a third middle part, a first plurality of diamond-shaped crushing blades, a second plurality of diamond-shaped crushing blades, and a bore head positioned at a bottom end of the mandrel. The first plurality of diamond-shaped crushing blades are attached around the first middle part and the second middle part. The second plurality of diamond-shaped crushing blades are attached around the third middle part and the bore head.

19 Claims, 26 Drawing Sheets

(56) References Cited

U.S. PATENT DOCUMENTS

| | | | | |
|---|---|---|---|---|
| 10,822,762 | B2 * | 11/2020 | Thomas | E02D 3/08 |
| 2003/0021637 | A1 * | 1/2003 | Yang | E02D 5/385<br>405/239 |
| 2007/0077128 | A1 * | 4/2007 | Wissmann | E02D 3/123<br>405/232 |
| 2011/0020069 | A1 * | 1/2011 | Richman | E02D 27/52<br>405/244 |
| 2011/0150577 | A1 * | 6/2011 | Koch | F16L 55/1658<br>405/184.3 |
| 2011/0243666 | A1 * | 10/2011 | Fox | E02D 5/62<br>405/232 |
| 2013/0051927 | A1 * | 2/2013 | Kruse | E02D 27/32<br>405/232 |
| 2016/0186398 | A1 * | 6/2016 | Niroumand | E02D 1/00<br>405/50 |
| 2016/0348330 | A1 * | 12/2016 | GangaRao | E02D 7/22 |
| 2017/0058477 | A1 * | 3/2017 | Niroumand | E02D 3/08 |
| 2019/0100892 | A1 * | 4/2019 | Niroumand | E21B 1/12 |

* cited by examiner

102

<u>105</u>

106

106

800

800

MANDREL FOR SOIL COMPACTION

CROSS-REFERENCE TO RELATED APPLICATION

This application claims the benefit of priority from U.S. Provisional Patent Application Ser. No. 63/059,983, filed on Aug. 1, 2020, and entitled "SEMI-DEEP COMPACTION OF LOOSE SOILS USING SPLITTER AND PENETRATING MANDRELS TECHNOLOGY UNDER DYNAMIC LOADS" which is incorporated herein by reference in its entirety.

TECHNICAL FIELD

The present disclosure generally relates to soil compaction systems, and particularly relates to mandrels for compacting soil at a target location.

BACKGROUND

In current civil engineering and building construction practice, many structures ranging from residential houses to high-rise buildings are built on deep foundation systems, such as piles or drilled piers, which extend to rock or stronger soils to provide support to the building. This is often necessary because soil near the surface frequently is inadequate for supporting the building upon a shallow foundation. These deep foundations tend to be rather expensive compared to shallow foundations and are typically necessary where the near-surface soils include soft to stiff clays, silts, sandy silts, loose to firm silty sands and sands. In most shallow foundations, the amount of settlement tolerable (influenced by the soil's compressibility) controls the usefulness of the shallow foundation, rather than the ultimate load-bearing capacity (strength). For some situations where the near-surface soils are inadequate or marginal for supporting shallow foundations, the in situ soils can be stiffened with reinforcement, such as short aggregate piers. This allows shallow foundations or smaller footings to be used in circumstances where there are space limitations. In either instance, a substantial cost saving can be realized using short aggregate piers to reinforce the near-surface soils.

Similar improvements in subgrade, subbase, and base materials beneath highways, railroads, and runways can result in substantial savings in construction costs. For example, in most highways that are in weak soil sites, the in-situ soil is probably incapable of adequately supporting a thin pavement wearing surface. The traditional solution is to excavate the existing soil to a certain depth, usually between four and twenty-four inches and replace the removed material with a material having greater load-bearing capabilities in a combination of compacted subbase to reduce potential damage from traffic caused by the poor load-bearing characteristics of the subgrade soil. In either event, a substantial cost is associated with the excavation and replacement or with the increased thickness of the wearing surface.

There are two well-known methods for producing a type of deep soil reinforcement known commonly as "stone columns" in situ to strengthen weak soils. These two methods are the so-called "vibro-replacement" and the "vibro-displacement" methods. Each of these methods leads to an improvement in the load-bearing capability of the ground, rather than producing a piling resting on bedrock, although stone columns are relatively deep and are often extended to stronger subsoils or even to bedrock.

The vibro-replacement technique (also known as the "wet-method") involves jetting a hole into the ground to a desired depth using a vibratory probe. The jetting is normally accomplished by forcing liquid under great pressure through a lower end of the probe to loosen and cut the soil and by forcing the probe downwardly into the ground. The uncased hole is then flushed out and, typically, uniform graded stone (stone which has been graded to have a relatively uniform particle size) is placed in the bottom of the hole in increments and is compacted by raising and lowering the probe, while at the same time vibrating the probe. The vibro-replacement method is characterized by relatively high cost owing to the rather heavy and specialized nature of the equipment necessary to carry out the method. This has tended to limit the use of the method to relatively large and expensive projects. Also, this technique can have a negative impact on the local environment due to the large quantities of water that are typically used in the process. This causes difficulties in disposing of the excess water and typically results in pools of standing water collected near the constructed columns. These pools of water can impede construction efforts at the site and add additional cost to the construction.

The second of the above-identified common methods of producing relatively deep stone columns in the ground is known as the "vibro-displacement" or dry method. In the vibro-displacement method, a vibratory probe is forced downwardly into the ground, displacing soil by compaction downwardly and laterally. Moreover, compressed air may be forced through the tip of the probe to ease penetration into the ground. Once the probe has reached the desired depth, the probe is withdrawn and backfill is added to the hole, the backfill typically being drawn from the site itself. The backfill is then compacted using the probe.

However, these methods suffer from requiring expensive and heavy specialized mandrels for compacting soil efficiently. Therefore, there is a need for a method and a simple and inexpensive mandrel for soil compaction.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a mandrel for soil compaction. An exemplary mandrel may include a base part, a first middle part, a second middle part, a third middle part, a first plurality of diamond-shaped crushing blades, a second plurality of diamond-shaped crushing blades, and a bore head.

In an exemplary embodiment, the base part may include a cylindrical-shaped structure. In an exemplary embodiment, the base part may be positioned at a top end of the mandrel. In an exemplary embodiment, the base part may include a shaft insertion hole and a cavity. In an exemplary embodiment, the shaft insertion hole may be on a top surface of the base part. In an exemplary embodiment, the shaft insertion hole may be configured to receive a shaft of a mechanical vibratory hammer. In an exemplary embodiment, the cavity may be placed at the bottom surface of the base part. In an exemplary embodiment, a diameter of the cavity may be ninety percent of a diameter of the base part. In an exemplary embodiment, a depth of the cavity may be 2 millimeters.

In an exemplary embodiment, the first middle part may include a first top surface, a first bottom surface, and a first lateral surface between the first top surface and the first bottom surface. In an exemplary embodiment, the first top surface may be attached to a top surface of the cavity. In an exemplary embodiment, a diameter of the first top surface may be 0.9 of the diameter of the cavity. In an exemplary embodiment, the first middle part and the base part may define a first angle between a main plane of the bottom surface of the base part and a tangential plane of the first lateral surface. In an exemplary embodiment, the first angle may be 135°.

In an exemplary embodiment, the second middle part may include a cylindrical-shaped structure. In an exemplary embodiment, the second middle part may include a second top surface and a second bottom surface. In an exemplary embodiment, the second top surface may be attached to the first bottom surface. In an exemplary embodiment, a diameter of the second top surface may be equal to a diameter of the first bottom surface. In an exemplary embodiment, a main longitudinal axis of the second middle part may be perpendicular to the main plane of the bottom surface of the base part.

In an exemplary embodiment, the third middle part may include a third top surface, a third bottom surface, and a third lateral surface. In an exemplary embodiment, the third top surface may be attached to the second bottom surface. In an exemplary embodiment, a diameter of the third top surface may be equal to a diameter of the second bottom surface. In an exemplary embodiment, the third lateral surface and the second bottom surface may define a second angle between a main plane of the second bottom surface and a tangential plane of the third lateral surface. In an exemplary embodiment, the second angle may be 135°.

In an exemplary embodiment, the first plurality of diamond-shaped crushing blades may be attached around the first middle part and the second middle part. In an exemplary embodiment, each respective diamond-shaped crushing blade from the first plurality of diamond-shaped crushing blades may include a first edge and a second edge. In an exemplary embodiment, each diamond-shaped crushing blade from the first plurality of diamond-shaped crushing blades may be attached at the respective first edge to the first lateral surface of the first middle part and attached at the respective second edge to the second lateral surface of the second middle part.

In an exemplary embodiment, the second plurality of diamond-shaped crushing blades may be attached around the third middle part and the bore head. In an exemplary embodiment, each respective diamond-shaped crushing blade from the second plurality of diamond-shaped crushing blades may include a third edge and a fourth edge. In an exemplary embodiment, each diamond-shaped crushing blade from the second plurality of diamond-shaped crushing blades may be attached at the respective third edge to the third lateral surface of the third middle part and attached at the respective fourth edge to the fourth lateral surface of the bore head.

In an exemplary embodiment, the bore head may be positioned at a bottom end of the mandrel. In an exemplary embodiment, a top surface of the bore head may be attached to the third bottom surface. In an exemplary embodiment, a diameter of the top surface of the bore head may be equal to a diameter of the third bottom surface. In an exemplary embodiment, the bore head may include a wedge-shaped tip at a bottom end of the bore head. In an exemplary embodiment, the wedge-shaped tip may be configured to tamper through hard rock surfaces. In an exemplary embodiment, the wedge-shaped tip may include a first inclined surface and a second inclined surface. In an exemplary embodiment, a bottom end of the first inclined surface may be attached to a bottom end of the second inclined surface. In an exemplary embodiment, the first inclined surface and the second inclined surface may define a wedge angle between a main plane of the first inclined surface and a main plane of the second inclined surface. In an exemplary embodiment, the wedge angle may be 32°.

In another aspect of the present disclosure, a method for soil compaction is presented. In an exemplary embodiment, the method may include positioning a mandrel above the target location, surface, the wedge angle being 32°, generating a first conical-shaped cavity by driving the mandrel into the target location, extracting the mandrel from the conical-shaped cavity, generating a first aggregate filled conical-shaped cavity by filling the conical-shaped cavity with aggregate, generating a second conical-shaped cavity by driving the mandrel into the first aggregate filled conical-shaped cavity, extracting the mandrel from the second conical-shaped cavity, generating a second aggregate filled conical-shaped cavity by filling the second conical-shaped cavity with aggregate, compacting the second aggregate filled conical-shaped cavity by ramming a first hammering device onto a top surface of the second aggregate filled conical-shaped cavity, and compacting the second aggregate filled conical-shaped cavity by ramming a second hammering device onto the top surface of the second aggregate filled conical-shaped cavity.

In an exemplary embodiment, generating the first aggregate filled conical-shaped cavity includes filling the first conical-shaped cavity with one of a gravel material, a loose sandy soil, a clayey soil, a medium density soil, a hard rock soil, and combination thereof. In an exemplary embodiment, generating the first aggregate filled conical-shaped cavity includes filling the first conical-shaped cavity with one of a gravel material, a loose sandy soil, a clayey soil, a medium density soil, a hard rock soil, and combination thereof.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

The present disclosure is directed to exemplary mandrels for performing soil compaction at a target location. An exemplary mandrel may provide a facility to forming a conical-shaped cavity at a target location. The conical-shaped cavity formed by utilizing an exemplary mandrel may further be used for some additional soil compaction methods for compacting the soil at the target location. An intended cavity may be formed at the target location by pushing an exemplary mandrel into the soil at the target location by utilizing a vibratory hammer.

Figure 1A:
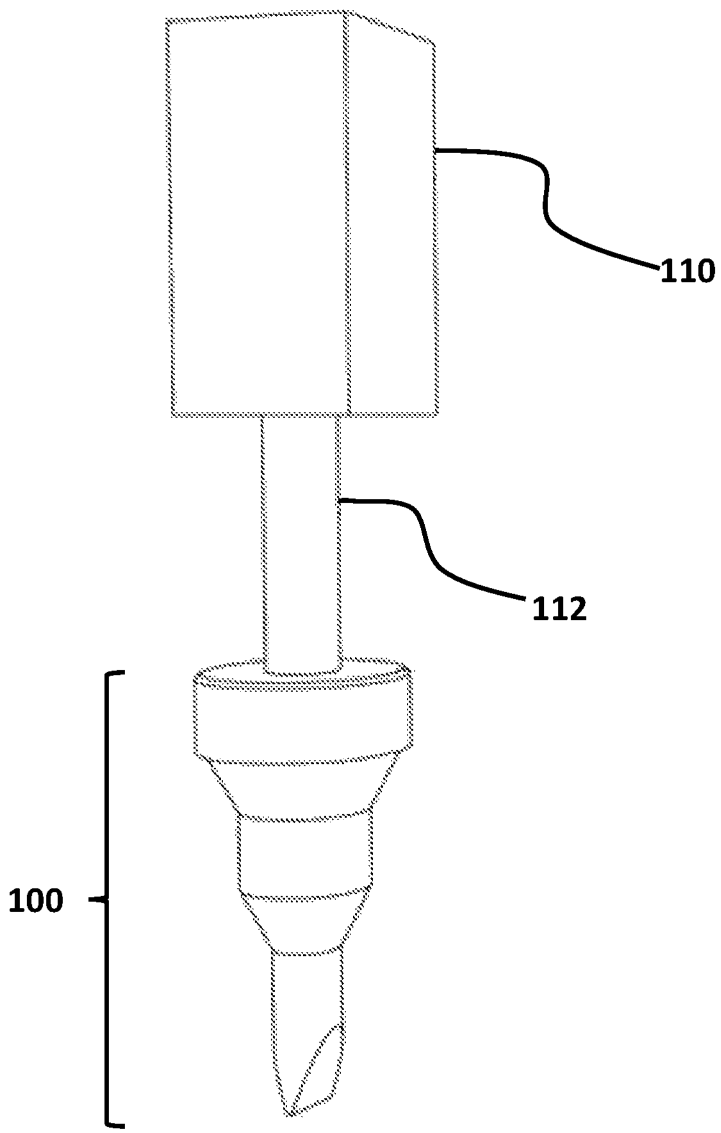
FIG. 1A illustrates a perspective view of a mandrel gripped by a mechanical vibratory hammer, consistent with one or more exemplary embodiments of the present disclosure.
Figure 1B:
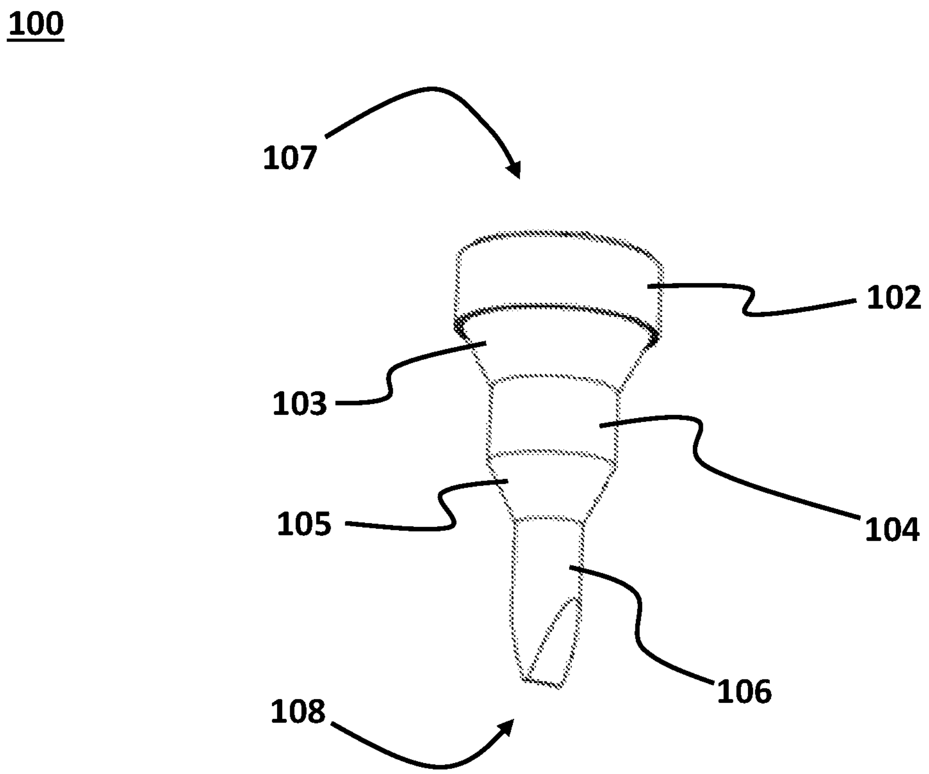
FIG. 1B illustrates a perspective view of a mandrel, consistent with one or more exemplary embodiments of the present disclosure.
Figure 1C:
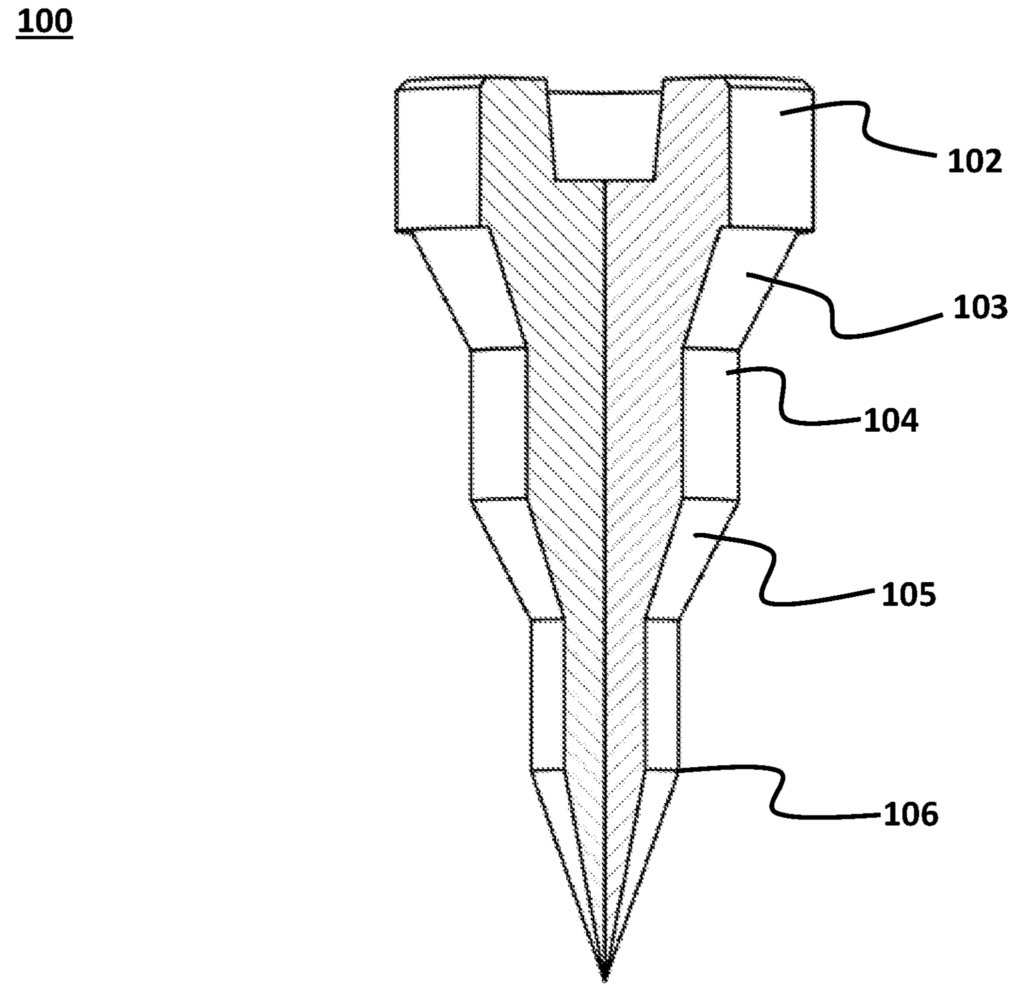
FIG. 1C illustrates a side sectional view of a mandrel, consistent with one or more exemplary embodiments of the present disclosure.

FIG. 1A shows a perspective view of a mandrel 100 gripped by a mechanical vibratory hammer 110, consistent with one or more exemplary embodiments of the present disclosure. FIG. 1B shows a perspective view of mandrel 100, consistent with one or more exemplary embodiments of the present disclosure. FIG. 1C shows a side sectional view of mandrel 100, consistent with one or more exemplary embodiments of the present disclosure. As shown in FIG. 1B and FIG. 1C, in an exemplary embodiment, mandrel 100 may include a base part 102, a first middle part 103, a second middle part 104, a third middle part 105, and a bore head 106.

Figure 2A:
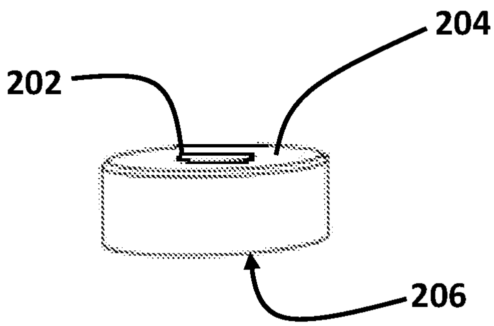
FIG. 2A illustrates a perspective view of a base part, consistent with one or more exemplary embodiments of the present disclosure.
Figure 2B:
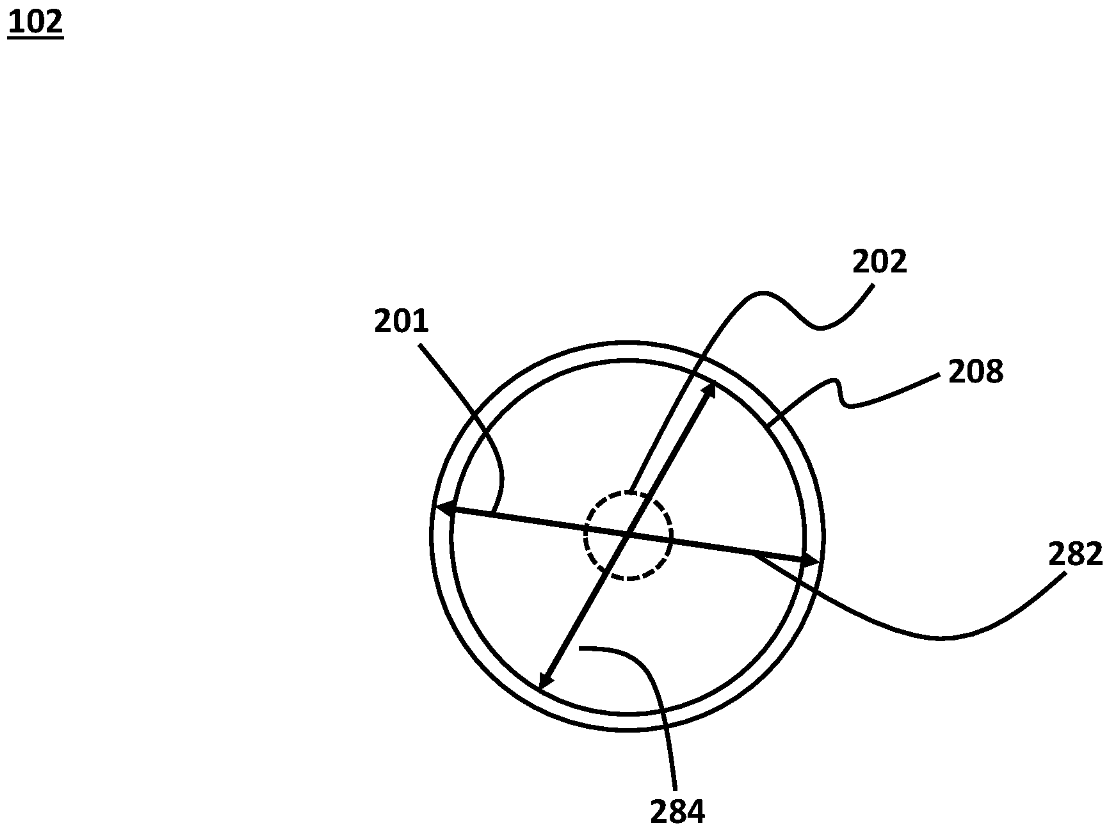
FIG. 2B illustrates a bottom view of a base part, consistent with one or more exemplary embodiments of the present disclosure.
Figure 2C:
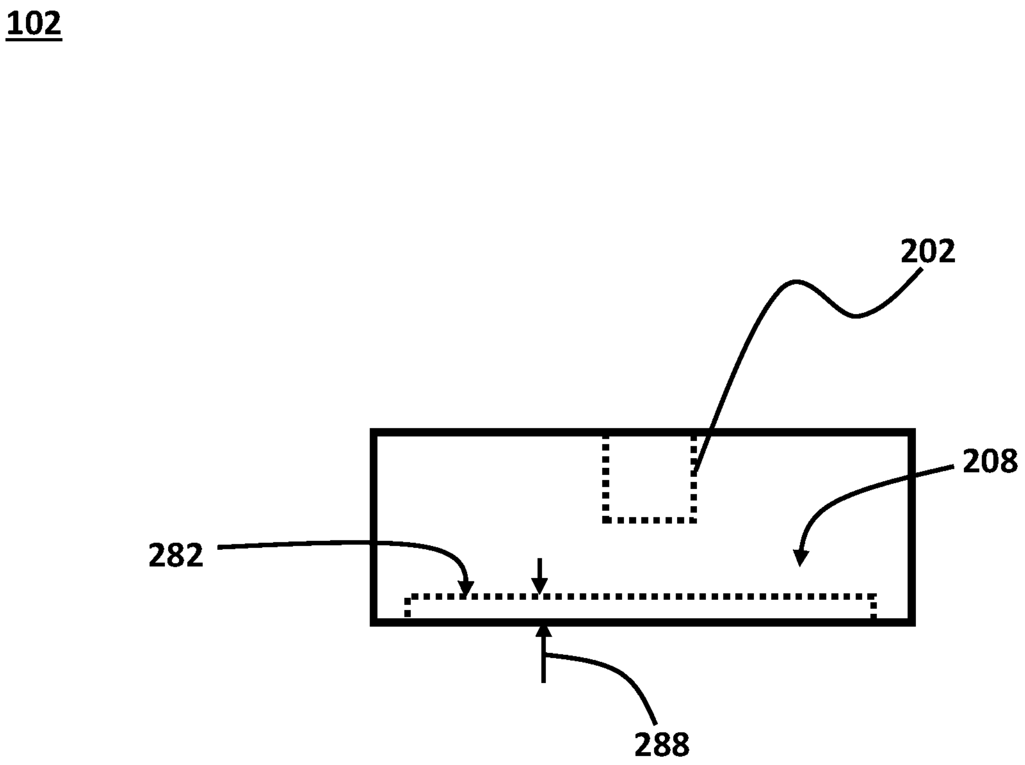
FIG. 2C illustrates a side view of a base part, consistent with one or more exemplary embodiments of the present disclosure.

In an exemplary embodiment, base part 102 may be positioned at a top end 107 of mandrel 100. In an exemplary embodiment, top end 107 of mandrel 100 may refer to an end of mandrel 100 which may be connected to a mechanical vibratory hammer. FIG. 2A shows a perspective view of base part 102, consistent with one or more exemplary embodiments of the present disclosure. FIG. 2B shows a bottom view of base part 102, consistent with one or more exemplary embodiments of the present disclosure. FIG. 2C shows a side view of base part 102, consistent with one or more exemplary embodiments of the present disclosure. As shown in FIG. 2A, in an exemplary embodiment, base part 102 may include a shaft insertion hole 202 on a top surface 204 of base part 102. In an exemplary embodiment, shaft insertion hole 202 may be configured to receive a shaft 112 of mechanical vibratory hammer 110.

Figure 3A:
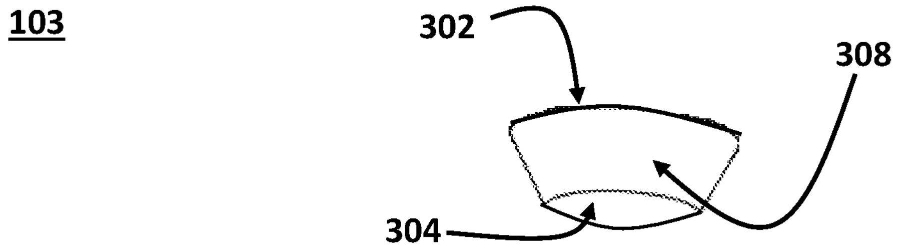
FIG. 3A illustrates a perspective view of a first middle part, consistent with one or more exemplary embodiments of the present disclosure.
Figure 3B:
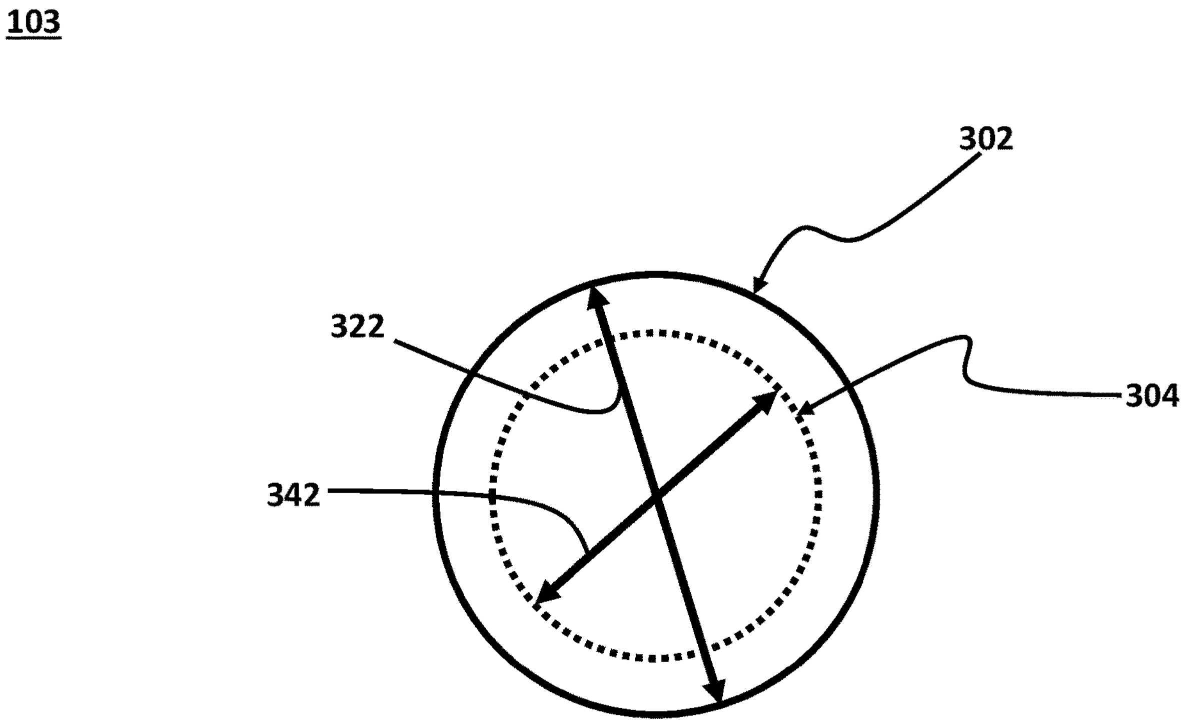
FIG. 3B illustrates a top view of a first middle part, consistent with one or more exemplary embodiments of the present disclosure.

FIG. 3A shows a perspective view of first middle part 103, consistent with one or more exemplary embodiments of the present disclosure. FIG. 3B shows a top view of first middle part 103, consistent with one or more exemplary embodiments of the present disclosure. In an exemplary embodiment, a first top surface 302 of first middle part 103 may be attached to a bottom surface 206 of base part 102. In an exemplary embodiment, base part 102 may include a cavity 208 at bottom surface 206 of base part 102. In an exemplary embodiment, a depth 288 of cavity 208 may be 2 millimeters. In an exemplary embodiment, first top surface 302 of first middle part 103 may be attached to a top surface 282 of cavity 208. In an exemplary embodiment, first middle part 103 and base part 102 may be manufactured seamlessly to create an integrated and/or unitary part. In an exemplary embodiment, a diameter 284 of cavity 208 may be between 80 and 98 percent of a diameter 201 of base part 102. For example, diameter 284 of cavity 208 may be 90 percent of diameter 201 of base part 102. In an exemplary embodiment, a diameter 322 of first top surface 302 may be between 80 and 98 percent of diameter 284 of cavity 208. For example, diameter 322 of first top surface 302 of first middle part 103 may be 90 percent of diameter 284 of cavity 208. In an exemplary embodiment, a diameter 342 of a first bottom surface 304 of first middle part 103 may be smaller than diameter 322 of first top surface 302 of first middle part 103.

Figure 3C:
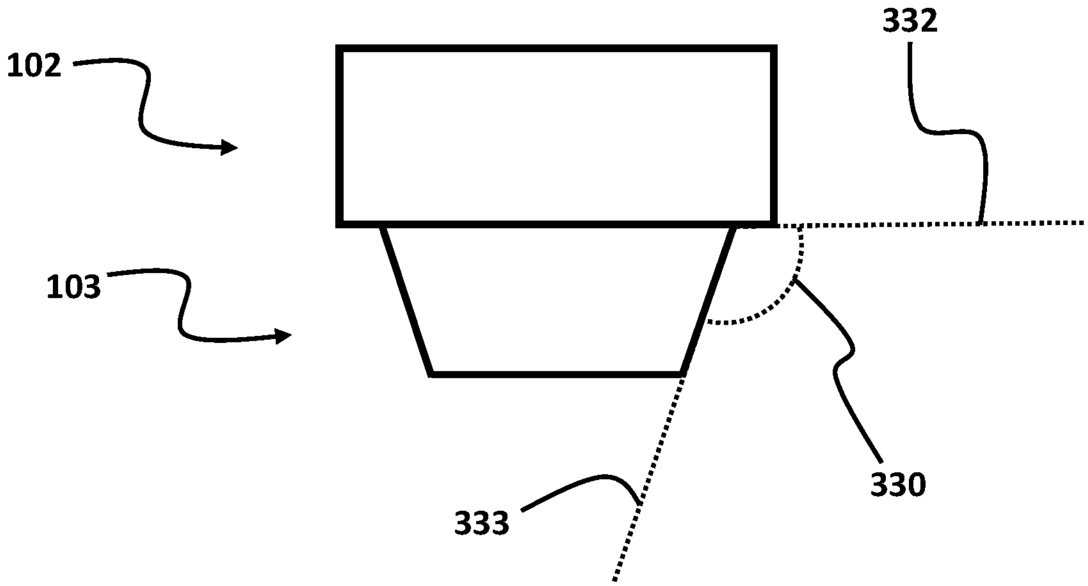
FIG. 3C illustrates a base part and a first middle part, consistent with one or more exemplary embodiments of the present disclosure.

In an exemplary embodiment, first middle part 103 may include a first lateral surface 308 between first top surface 302 of first middle part 103 and first bottom surface 304 of first middle part 103. In an exemplary embodiment, first lateral surface 308 of first middle part 103 may be an inclined surface. FIG. 3C shows base part 102 and first middle part 103, consistent with one or more exemplary embodiments of the present disclosure. As shown in FIG. 3C, in an exemplary embodiment, base part 102 and first middle part 103 may define a first angle 330 between a main plane 332 of bottom surface 206 of base part 102 and a first tangential plane 333 of first lateral surface 308 of first middle part 103. In an exemplary embodiment, first angle 330 may be in a range between 130° and 150°. In an exemplary embodiment, first angle 330 may be 135°.

Figure 4A:
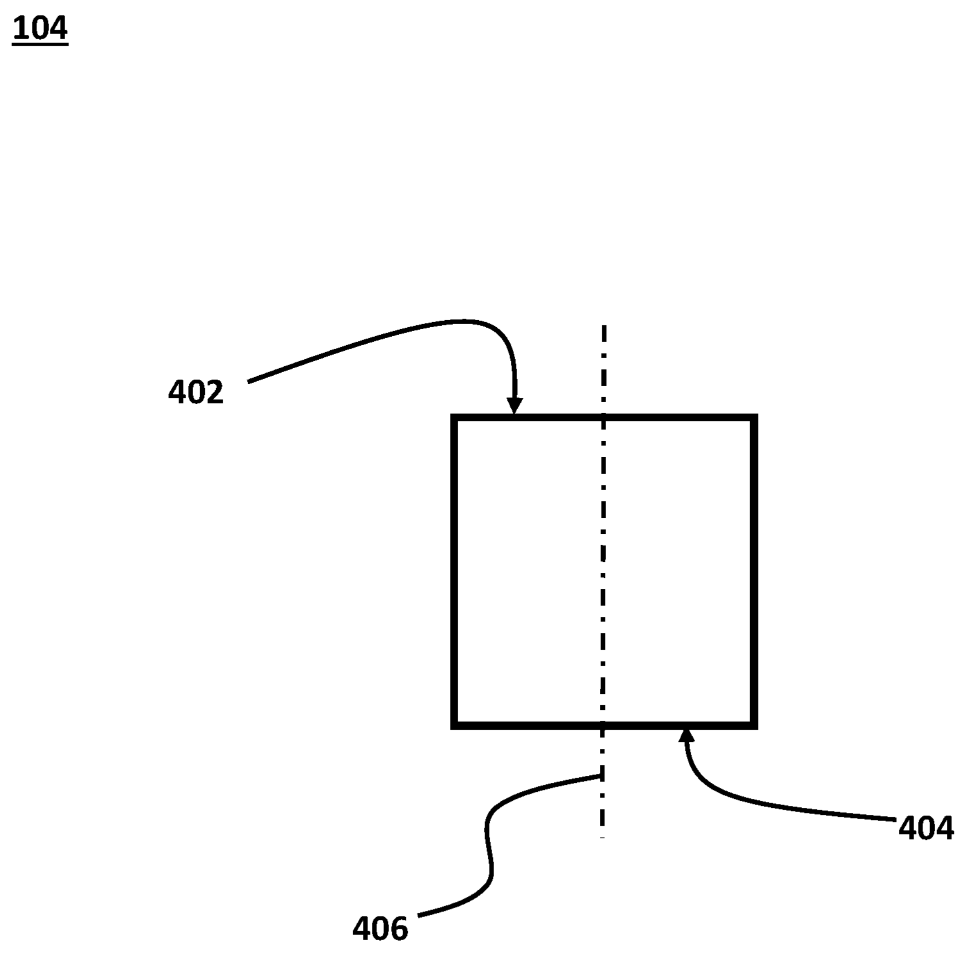
FIG. 4A illustrates a side view of a second middle part, consistent with one or more exemplary embodiments of the present disclosure.
Figure 4B:
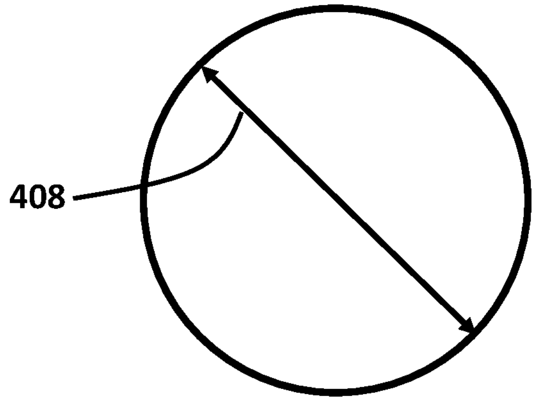
FIG. 4B illustrates a top view of a second middle part, consistent with one or more exemplary embodiments of the present disclosure.

FIG. 4A shows a side view of second middle part 104, consistent with one or more exemplary embodiments of the present disclosure. FIG. 4B shows a top view of second middle part 104, consistent with one or more exemplary embodiments of the present disclosure. In an exemplary embodiment, second middle part 104 may include a second top surface 402 and a second bottom surface 404. In an exemplary embodiment, second top surface 402 of second middle part 104 may be attached to first bottom surface 304 of first middle part 103. In an exemplary embodiment, second middle part 104 and first middle part 103 may be manufactured seamlessly to create an integrated and/or unitary part. In an exemplary embodiment, second top surface 402 of second middle part 104 may be attached to first bottom surface 304 of first middle part 103 in such a way that a main longitudinal axis 406 of second middle part 104 is perpendicular to main plane 332 of bottom surface 206 of base part 102. In an exemplary embodiment, a diameter 408 of second middle part 104 may be equal to diameter 342 of first bottom surface 304.

Figure 5A:
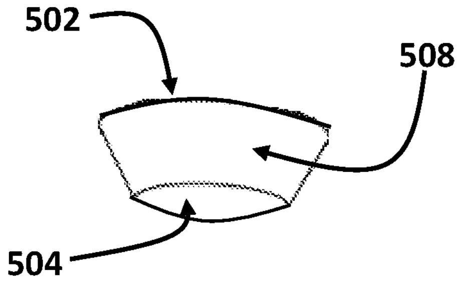
FIG. 5A illustrates a perspective view of a third middle part, consistent with one or more exemplary embodiments of the present disclosure.
Figure 5B:
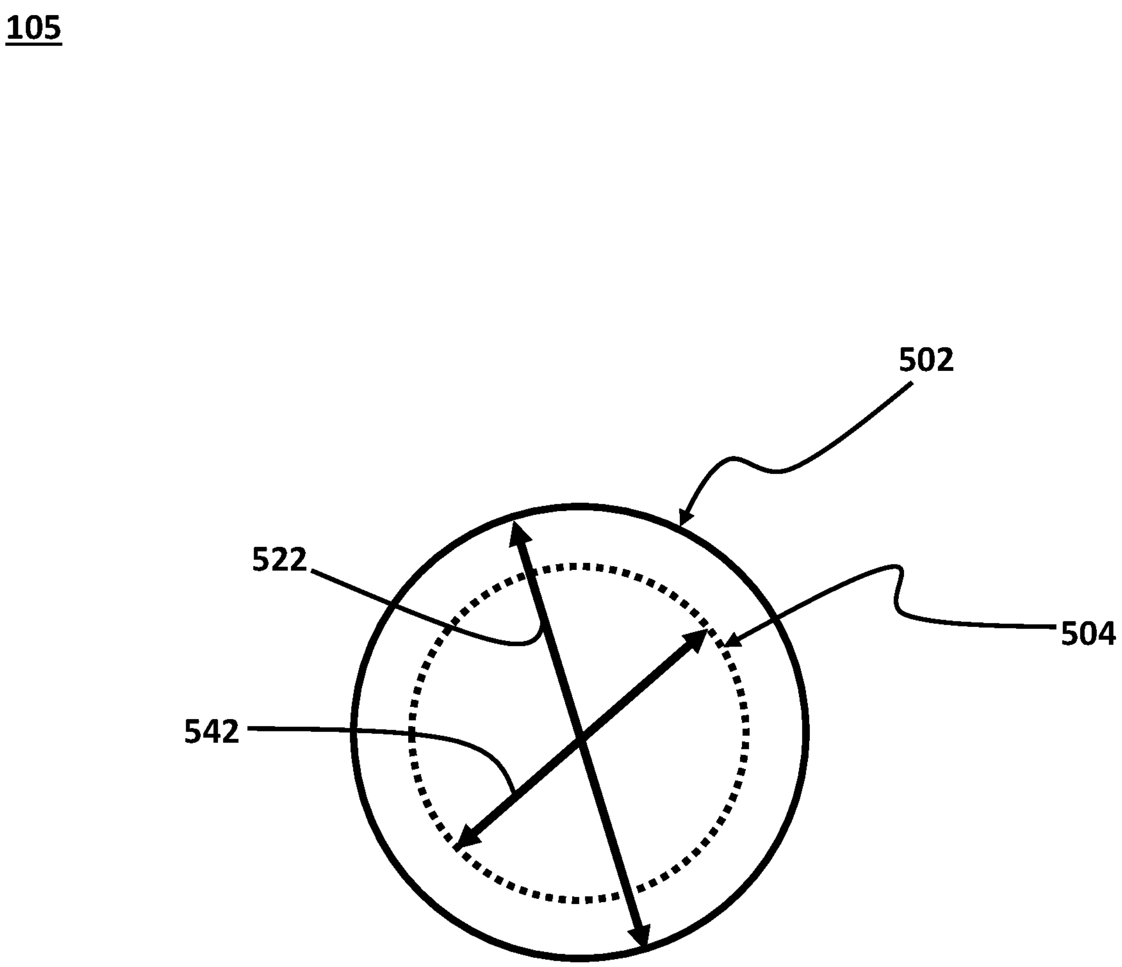
FIG. 5B illustrates a top view of a third middle part, consistent with one or more exemplary embodiments of the present disclosure.

FIG. 5A shows a perspective view of third middle part 105, consistent with one or more exemplary embodiments of the present disclosure. FIG. 5B shows a top view of third middle part 105, consistent with one or more exemplary embodiments of the present disclosure. In an exemplary embodiment, third middle part 105 may include a third top surface 502, a third bottom surface 504, and a third lateral surface 508 between third top surface 502 and third bottom surface 504. In an exemplary embodiment, third top surface 502 of third middle part 105 may be attached to second bottom surface 404 of second middle part 104. In an exemplary embodiment, second middle part 104 and third middle part 105 may be manufactured seamlessly to create an integrated and/or unitary part. In an exemplary embodiment, a diameter 522 of third top surface 502 may be equal to diameter 408 of second middle part 104.

Figure 5C:
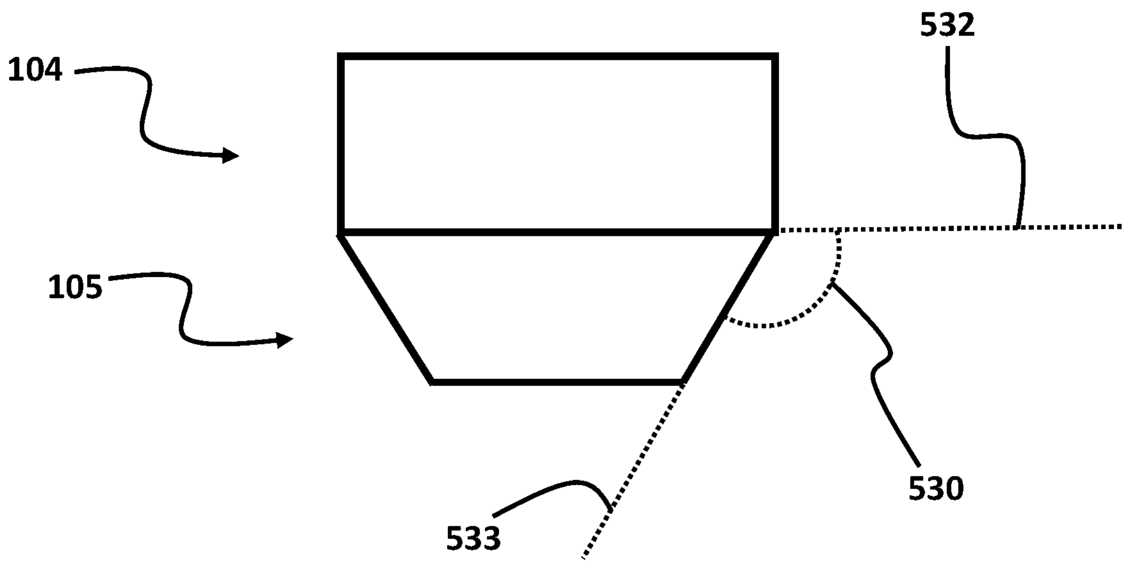
FIG. 5C illustrates a second middle part and a third middle part, consistent with one or more exemplary embodiments of the present disclosure.

FIG. 5C shows second middle part 104 and third middle part 105, consistent with one or more exemplary embodiments of the present disclosure. As shown in FIG. 5C, in an exemplary embodiment, second middle part 104 and third middle part 105 may define a second angle 530 between a main plane 532 of third bottom surface 504 of third middle part 105 and a second tangential plane 533 of third lateral surface 508. In an exemplary embodiment, second angle 530 may be in a range between 130° and 150°. In an exemplary embodiment, second angle 530 may be 135°.

Figure 6A:
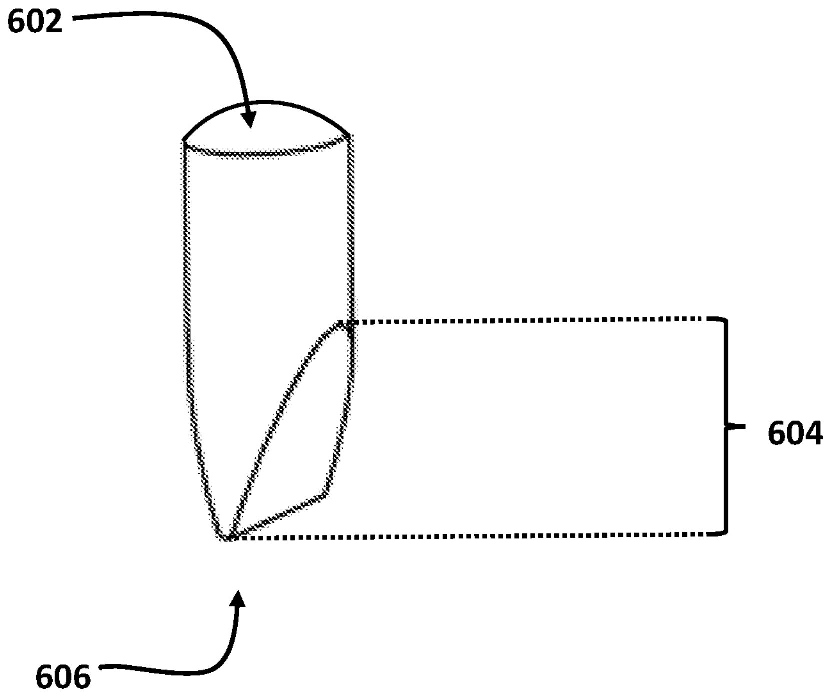
FIG. 6A illustrates a perspective view of a bore head, consistent with one or more exemplary embodiments of the present disclosure.
Figure 6B:
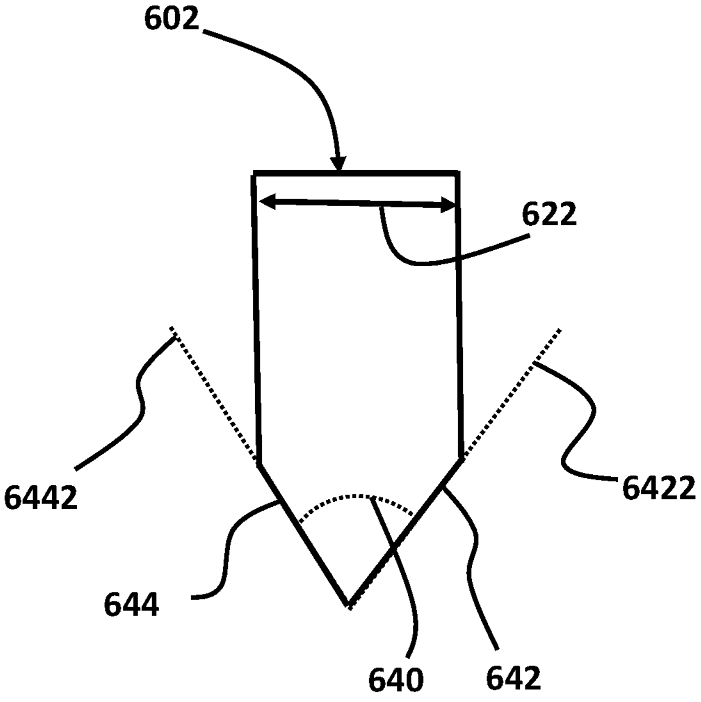
FIG. 6B illustrates a side view of a bore head, consistent with one or more exemplary embodiments of the present disclosure.

FIG. 6A shows a perspective view of bore head 106, consistent with one or more exemplary embodiments of the present disclosure. FIG. 6B shows a side view of bore head 106, consistent with one or more exemplary embodiments of the present disclosure. In an exemplary embodiment, bore head 106 may include a top surface 602. In an exemplary embodiment, top surface 602 of bore head 106 may be attached to third bottom surface 504 of third middle part 105. In an exemplary embodiment, a diameter 622 of top surface 602 of bore head 106 may be equal to a diameter 542 of to third bottom surface 504. In an exemplary embodiment, bore head 106 and third middle part 105 may be manufactured seamlessly to create an integrated and/or unitary part. In an exemplary embodiment, bore head 106 may further include a wedge-shaped tip 604 at a bottom end 606 of bore head 106. In an exemplary embodiment, it may be understood that wedge-shaped tip 604 may provide significant benefits including but not limited to a facility for tampering through hard rock surfaces and penetrating the hard parts and crushing them.

In an exemplary embodiment, wedge-shaped tip 604 may include a first inclined surface 642 and a second inclined surface 644. In an exemplary embodiment, first inclined surface 642 and second inclined surface 644 may define a wedge angle 640 between a main plane 6422 of first inclined surface 642 and a main plane 6442 of second inclined surface 644. In an exemplary embodiment, wedge angle 640 may be in a range between 20° and 45°. In an exemplary embodiment, wedge angle 640 may be 32°. In an exemplary embodiment, when wedge angle 640 is 32°, bore head 106 may be able to tamper through hard rock surfaces and penetrate the hard parts and crush them more efficiently relative to other optional amounts of wedge angle 640. In an exemplary embodiment, when bore head 106 tampers through hard rock surfaces and penetrates the hard parts and crushes them more efficiently, it may mean that by applying less force to mandrel 100 from mechanical vibratory hammer 110, bore head 106 tampers through hard rock surfaces and penetrates the hard parts and crushes them.

Figure 7A:
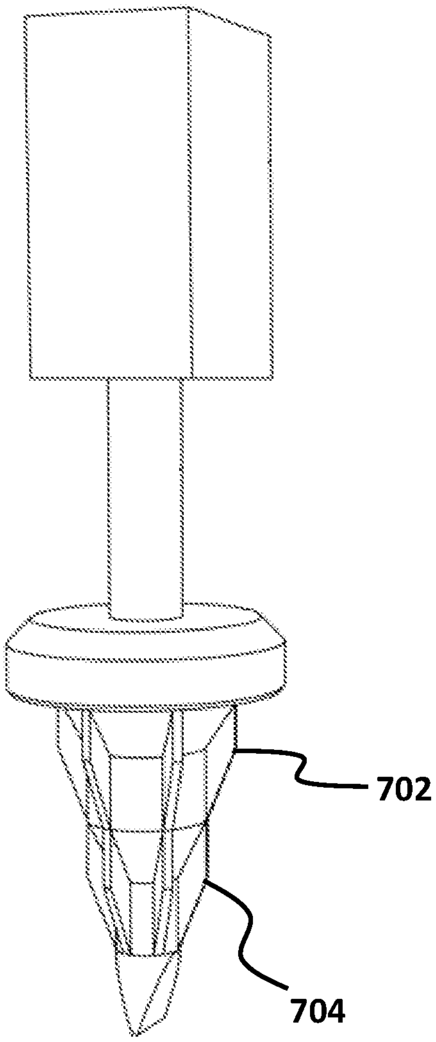
FIG. 7A illustrates a perspective view of a mandrel gripped by a mechanical vibratory hammer, consistent with one or more exemplary embodiments of the present disclosure.
Figure 7B:
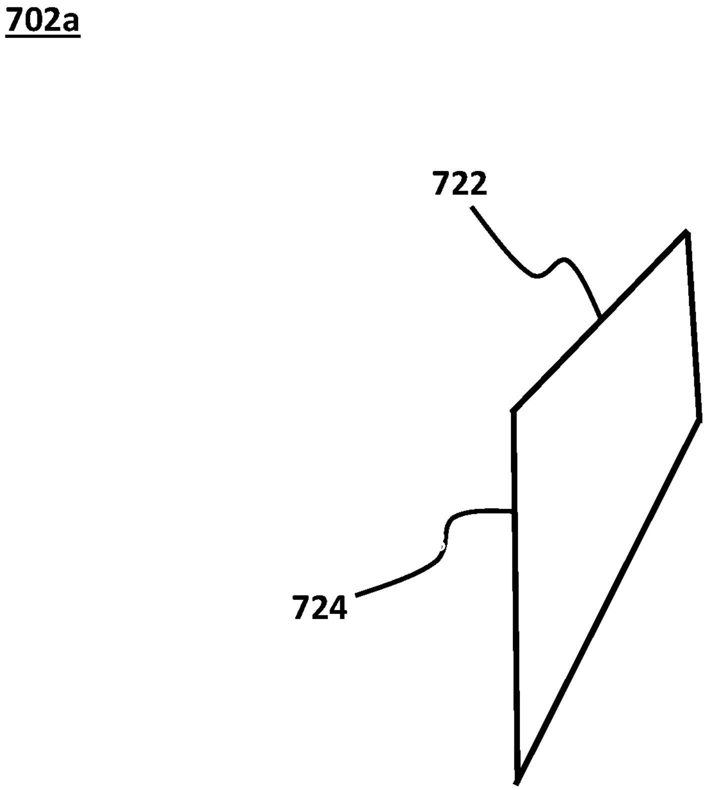
FIG. 7B illustrates a first diamond-shaped crushing blade, consistent with one or more exemplary embodiments of the present disclosure.

FIG. 7A shows a perspective view of a mandrel 100 gripped by a mechanical vibratory hammer 110, consistent with one or more exemplary embodiments of the present disclosure. As shown in FIG. 7A, in an exemplary embodiment, mandrel 100 may further include a first plurality of diamond-shaped crushing blades 702. In an exemplary embodiment, first plurality of diamond-shaped crushing blades 702 may be attached around first middle part 103 and second middle part 104. FIG. 7B shows a first diamond-shaped crushing blade 702*a*, consistent with one or more exemplary embodiments of the present disclosure. In an exemplary embodiment, first diamond-shaped crushing blade 702*a* may be one of first plurality of diamond-shaped crushing blades 702. In an exemplary embodiment, a thickness of first diamond-shaped crushing blade 702*a* may be 2 millimeters.

In an exemplary embodiment, first diamond-shaped crushing blade 702*a* may include a first edge 722 and a second edge 724. In an exemplary embodiment, first edge 722 of first diamond-shaped crushing blade 702*a* may be attached to first lateral surface 308 of first middle part 103. In an exemplary embodiment, second edge 724 may be attached to a second lateral surface of second middle part 104.

Figure 7C:
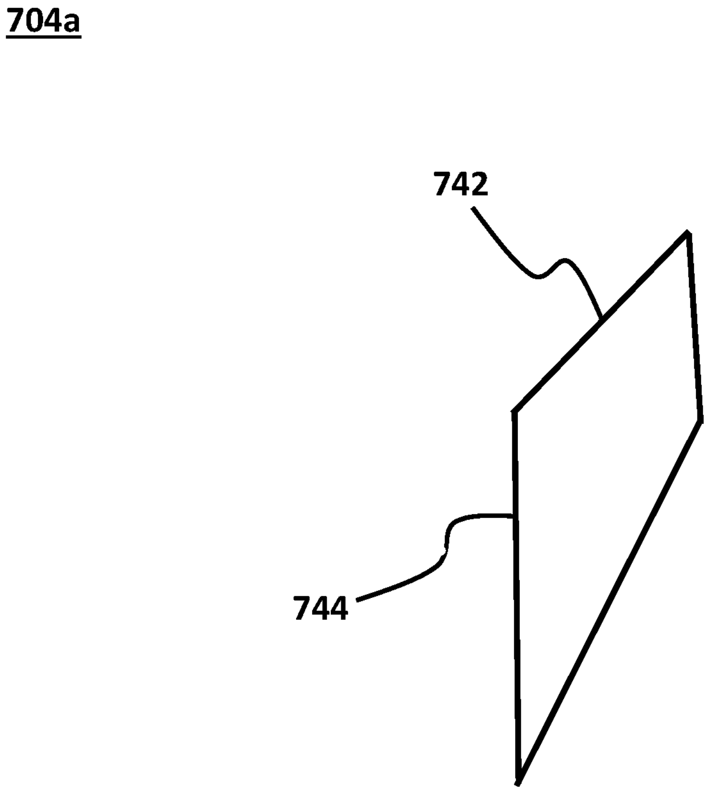
FIG. 7C illustrates a second diamond-shaped crushing blade, consistent with one or more exemplary embodiments of the present disclosure.

As shown in FIG. 7A, in an exemplary embodiment, mandrel 100 may further include a second plurality of diamond-shaped crushing blades 704. In an exemplary embodiment, second plurality of diamond-shaped crushing blades 704 may be attached around third middle part 105 and bore head 106. FIG. 7C shows a second diamond-shaped crushing blade 704*a*, consistent with one or more exemplary embodiments of the present disclosure. In an exemplary embodiment, second diamond-shaped crushing blade 704*a* may be one of second plurality of diamond-shaped crushing blades 704. In an exemplary embodiment, a thickness of second diamond-shaped crushing blade 704*a* may be 2 millimeters.

In an exemplary embodiment, second diamond-shaped crushing blade 704*a* may include a third edge 742 and a fourth edge 744. In an exemplary embodiment, third edge 742 of second diamond-shaped crushing blade 704*a* may be attached to third lateral surface 508 of third middle part 105. In an exemplary embodiment, fourth edge 744 may be attached to a fourth lateral surface of bore head 106. In an exemplary embodiment, first plurality of diamond-shaped crushing blades 702 and second plurality of diamond-shaped crushing blades 704 may provide significant benefits. For example, first plurality of diamond-shaped crushing blades 702 and second plurality of diamond-shaped crushing blades 704 may remove hard particles from around the main body of mandrel 100 and, thereby, reduce the frictional force between the hard particles in soil and the main body of mandrel 100. In an exemplary embodiment, it may be understood that this reduction in frictional force, may increase the penetration efficiency of mandrel 100 into soil. In an exemplary embodiment, mandrel 100 may be utilized to destroy porous soil structures and pass through layers with hard particles.

Figure 8A:
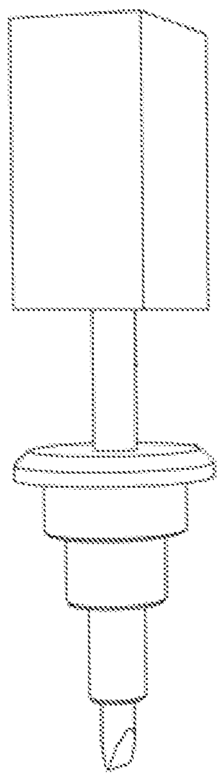
FIG. 8A illustrates a perspective view of a mandrel gripped by mechanical vibratory hammer, consistent with one or more exemplary embodiments of the present disclosure.
Figure 8B:
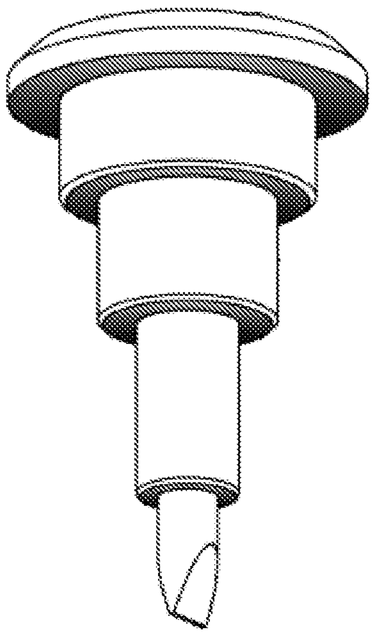
FIG. 8B illustrates another perspective view of a mandrel, consistent with one or more exemplary embodiments of the present disclosure.
Figure 8C:
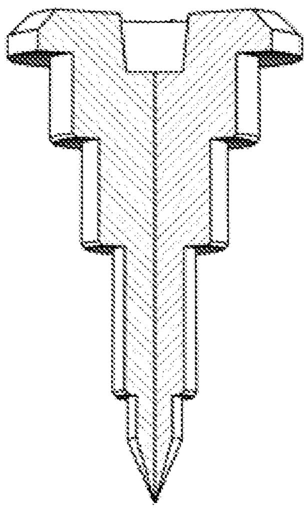
FIG. 8C illustrates a sectional view of a mandrel, consistent with one or more exemplary embodiments of the present disclosure.

FIG. 8A shows a perspective view of a mandrel 800 gripped by mechanical vibratory hammer 110, consistent with one or more exemplary embodiments of the present disclosure. FIG. 8B shows another perspective view of mandrel 800, consistent with one or more exemplary embodiments of the present disclosure. FIG. 8C shows a sectional view of mandrel 800, consistent with one or more exemplary embodiments of the present disclosure.

In an exemplary embodiment, by utilizing mandrel 100 for soil compaction, when mandrel 100 is being pushed into the ground at a target location, in addition to radially compact the soil around the target location, mandrel 100 may also compact the soil around the target location downwardly. In fact, the specific structure of mandrel 100 may provide some benefits. For example, when mandrel 100 is pushed into the ground by exerting a pushing force from mechanical vibratory hammer 110, a specific percentage of the pushing force exerted to mandrel 100 from mechanical vibratory hammer 110 may be consumed to compact the soil downwardly which may reduce swelling of the soil or otherwise prevent it. In an exemplary embodiment, by utilizing mandrel 100, due to a decrease in radial stresses around mandrel 100, swelling of the soil may be reduced or prevented. For purpose of reference, it may be understood that when soil swells during soil compaction, it may indicate that the soil is not being compacted properly and effectively. In an exemplary embodiment, the swelling of the soil may indicate that a general failure has been occurred in the soil. In an exemplary embodiment, mandrel 100 may be used for semi-deep compaction of loose soils by utilizing dynamic loads.

By using conventional mandrels, due to the low thickness of problematic layers and absence of soil overburden, forming wells in soils with medium relative density may lead to swelling of the soil around the mandrel. However, in natural subgrades and uncompact engineering embankments which are located below a dense layer caused by movement of vehicles on the ground, swelling of the soil around the mandrel may be hard to prevent. In addition, in soil layers consisting of construction debris and relatively large rocks in artificial or natural soil textures, despite the passage of a conventional mandrel through hard particles, a lot of forces may be applied to the body parts and this may reduce the penetration efficiency of the mandrel and may lead to premature failure of the mandrel.

In an exemplary embodiment, using mandrel 100 for soil compaction may provide some significant benefits. For example, swelling of the soil around mandrel 100 may be reduced. Also, forces which may be applied by the hard layers to mandrel 100 may be reduced and, thereby, efficiency of mandrel 100 may be increase. As another benefit, by using mandrel 100 for soil compaction, early failure of the mandrel may be prevented and also the life of the mandrel may be increased.

Figure 9A:
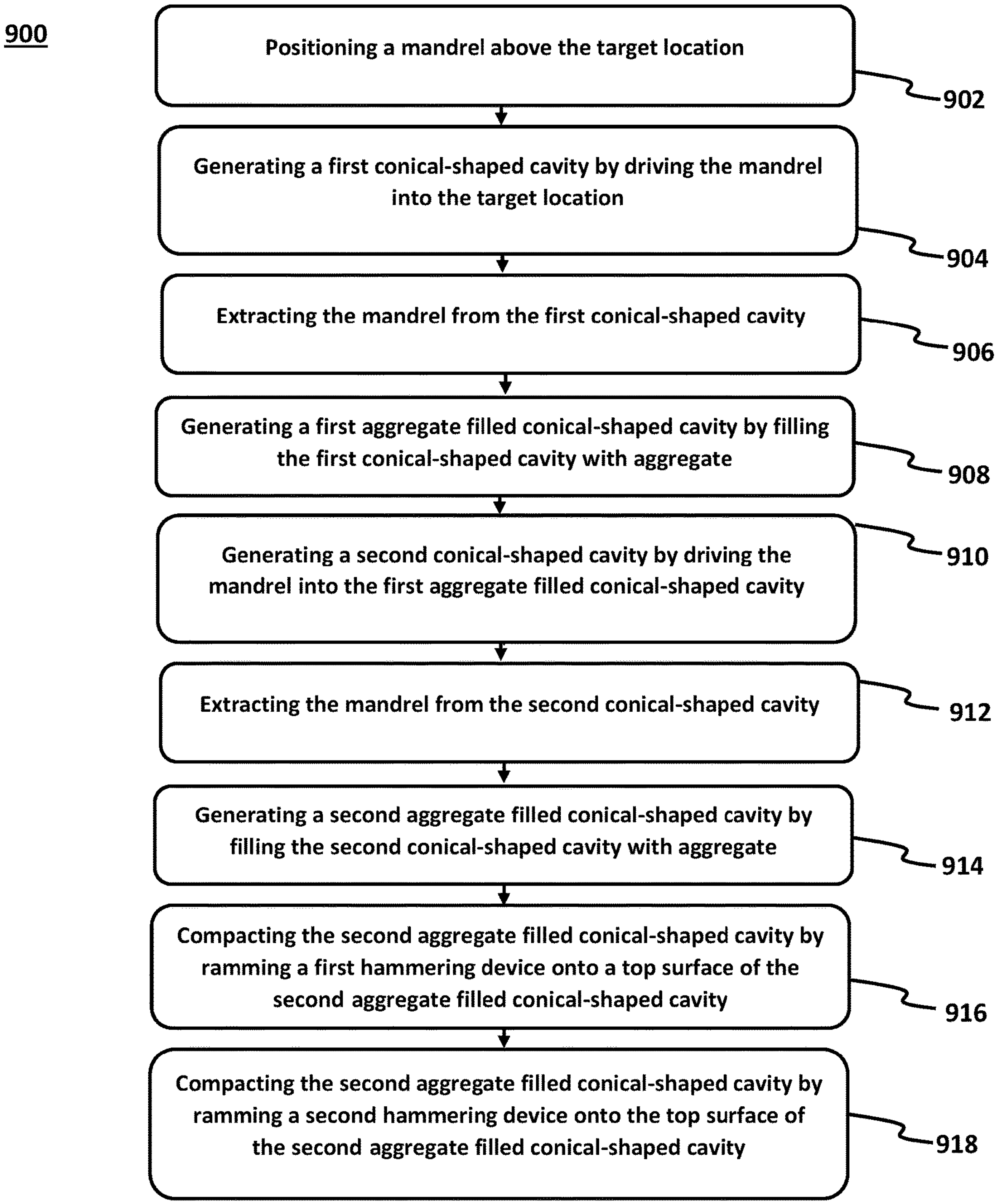
FIG. 9A is a method for soil compaction at a target location, consistent with one or more exemplary embodiments of the present disclosure.
Figure 9B:
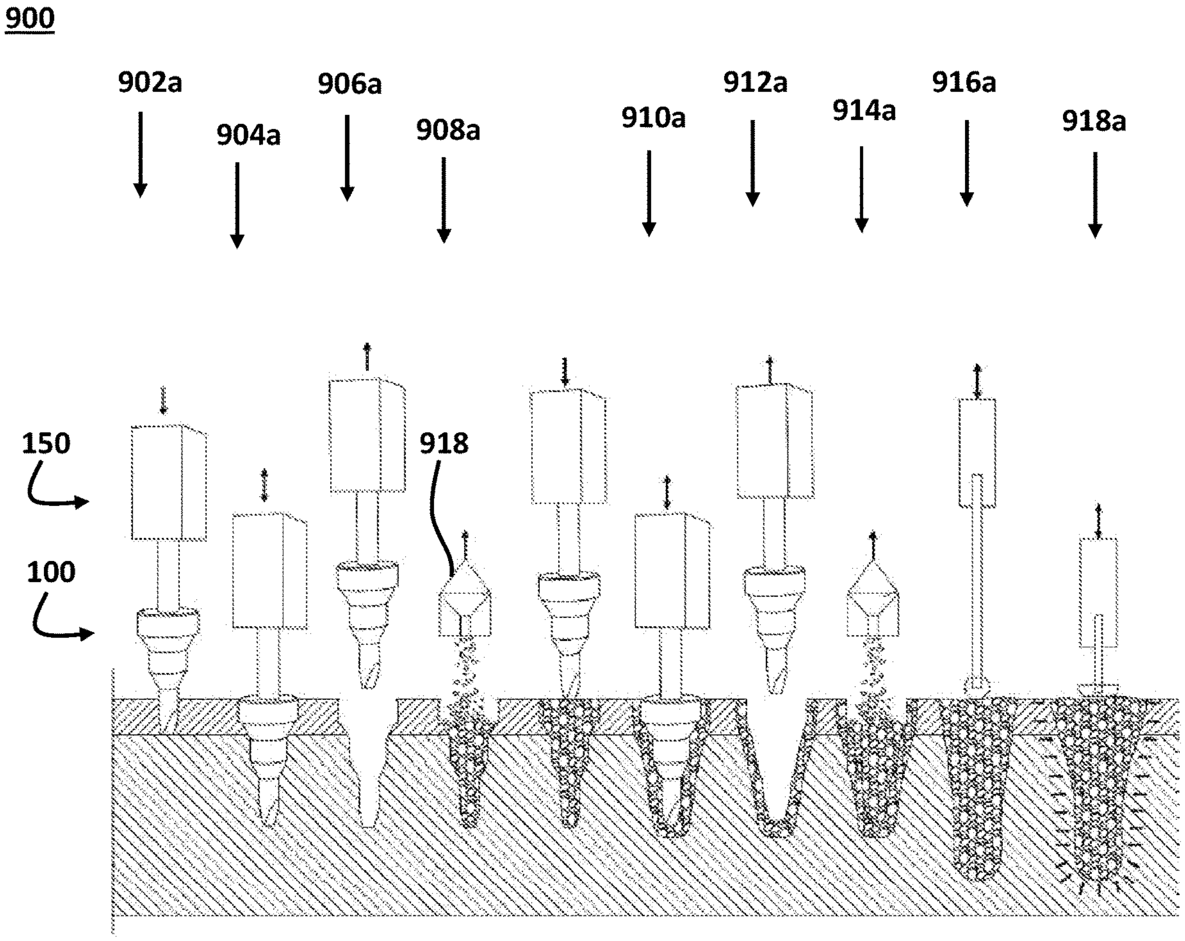
FIG. 9B illustrates a schematic implementation of a method for soil compaction at a target location, consistent with one or more exemplary embodiments of the present disclosure.

FIG. 9A is a method 900 for soil compaction at a target location, consistent with one or more exemplary embodiments of the present disclosure. FIG. 9B shows a schematic implementation of method 900 for soil compaction at a target location, consistent with one or more exemplary embodiments of the present disclosure. As shown in FIG. 9A, in an exemplary embodiment, method 900 may include step 902 of positioning a mandrel above the target location. In an exemplary embodiment, step 602*a* in FIG. 9B corresponds to step 902 in FIG. 9A. In an exemplary embodiment, the mandrel utilized in step 902 of method 900 may be substantially analogous in structure and functionality to a mandrel 100 as shown in FIGS. 1A, 1B, and 1C.

With the further reference to FIG. 9A, in an exemplary embodiment, method 900 may include step 904 of generating a first conical-shaped cavity by driving the mandrel into the target location. In an exemplary embodiment, step 904*a* in FIG. 9B corresponds to step 904 in FIG. 9A. In an exemplary embodiment, method 900 may further include step 906 of extracting the mandrel from the first conical-shaped cavity. In an exemplary embodiment, step 906*a* in FIG. 9B corresponds to step 906 in FIG. 9A. In an exemplary embodiment, method 900 may also include step 908 of generating a first aggregate filled conical-shaped cavity by filling the first conical-shaped cavity with aggregate. In an exemplary embodiment, step 908*a* in FIG. 9B corresponds to step 908 in FIG. 9A. In an exemplary embodiment, the aggregate may include one of a gravel material, a loose sandy soil, a clayey soil, a medium density soil, a hard rock soil, and combination thereof. As shown in FIG. 9B, in an exemplary embodiment, generating the first aggregate filled conical-shaped cavity by filling the conical-shaped cavity with the aggregate may be implemented utilizing a hopper 918. In an exemplary embodiment, method 900 may further include step 910 of generating a second conical-shaped cavity by driving the mandrel into the first aggregate filled conical-shaped cavity. In an exemplary embodiment, step 910*a* in FIG. 9B corresponds to step 910 in FIG. 9A. In an exemplary embodiment, method 900 may further include step 912 of extracting the mandrel from the second conical shaped cavity. In an exemplary embodiment, step 912*a* in FIG. 9B corresponds to step 912 in FIG. 9A. In an exemplary embodiment, method 900 may also include step 914 of generating a second aggregate filled conical-shaped cavity by filling the second conical-shaped cavity with aggregate. In an exemplary embodiment, step 914*a* in FIG. 9B corresponds to step 914 in FIG. 9A. As shown in FIG. 9B, in an exemplary embodiment, generating the second aggregate filled conical-shaped cavity by filling the conical-shaped cavity with the aggregate may be implemented utilizing hopper 918.

Figure 9C:
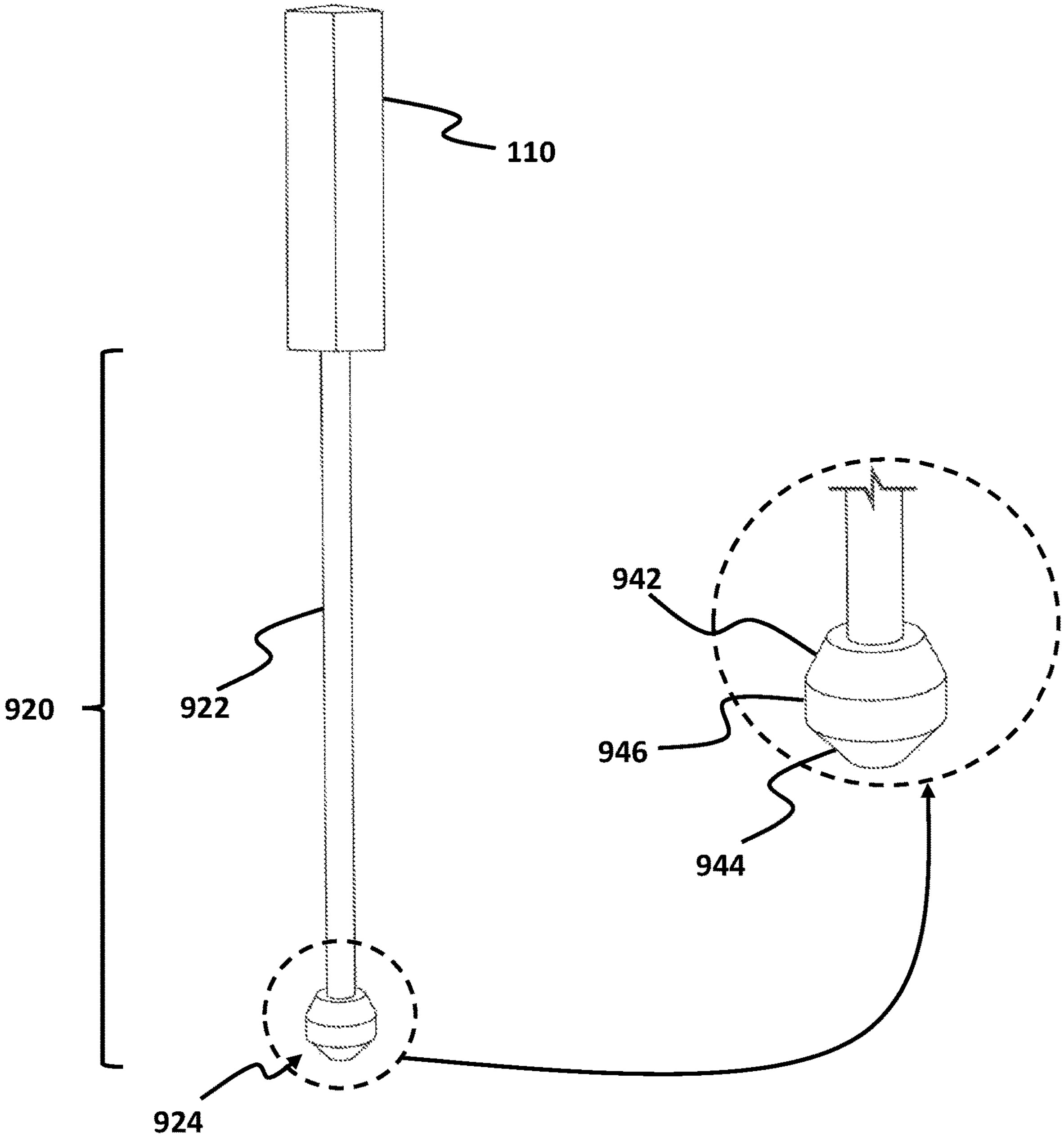
FIG. 9C illustrates a high-frequency impact tamper gripped by a mechanical vibratory hammer, consistent with one or more exemplary embodiments of the present disclosure.

In an exemplary embodiment, method 900 may further include step 916 of compacting the second aggregate filled conical-shaped cavity by ramming a first hammering device onto a top surface of the second aggregate filled conical-shaped cavity. In an exemplary embodiment, step 916*a* in FIG. 9B corresponds to step 916 in FIG. 9A. FIG. 9C shows a high-frequency impact tamper gripped by a mechanical vibratory hammer, consistent with one or more exemplary embodiments of the present disclosure. In an exemplary embodiment, the first hammering device utilized in step 916 of method 900 may be substantially analogous in structure and functionality to a high-frequency impact tamper 920 as shown in FIG. 9C.

As shown in FIG. 9C, in an exemplary embodiment, high-frequency impact tamper 700 may include a first rod 922 and a ramming head 924. In an exemplary embodiment, first rod 922 may include a first end and a second end. In an exemplary embodiment, first rod 922 may be inserted in mechanical vibratory hammer 110 from the first end of first rod 922. In an exemplary embodiment, ramming head 924 may include a first rod attaching section 942, a beveled-shaped ramming tip 944, and a cylindrical section 946.

In an exemplary embodiment, first rod ramming head 924 may be attached from first rod attaching section 942 to the second end of first rod 922. As shown in FIG. 9C, in an exemplary embodiment, cylindrical section 946 may be positioned between first rod attaching section 942 and beveled-shaped ramming tip 944.

In an exemplary embodiment, method 900 may further include step 918 of compacting the second aggregate filled conical-shaped cavity 620 by ramming a second hammering device onto the top surface of the second aggregate filled conical-shaped cavity. In an exemplary embodiment, step 920*a* in FIG. 9B corresponds to step 920 in FIG. 9A.

Figure 9D:
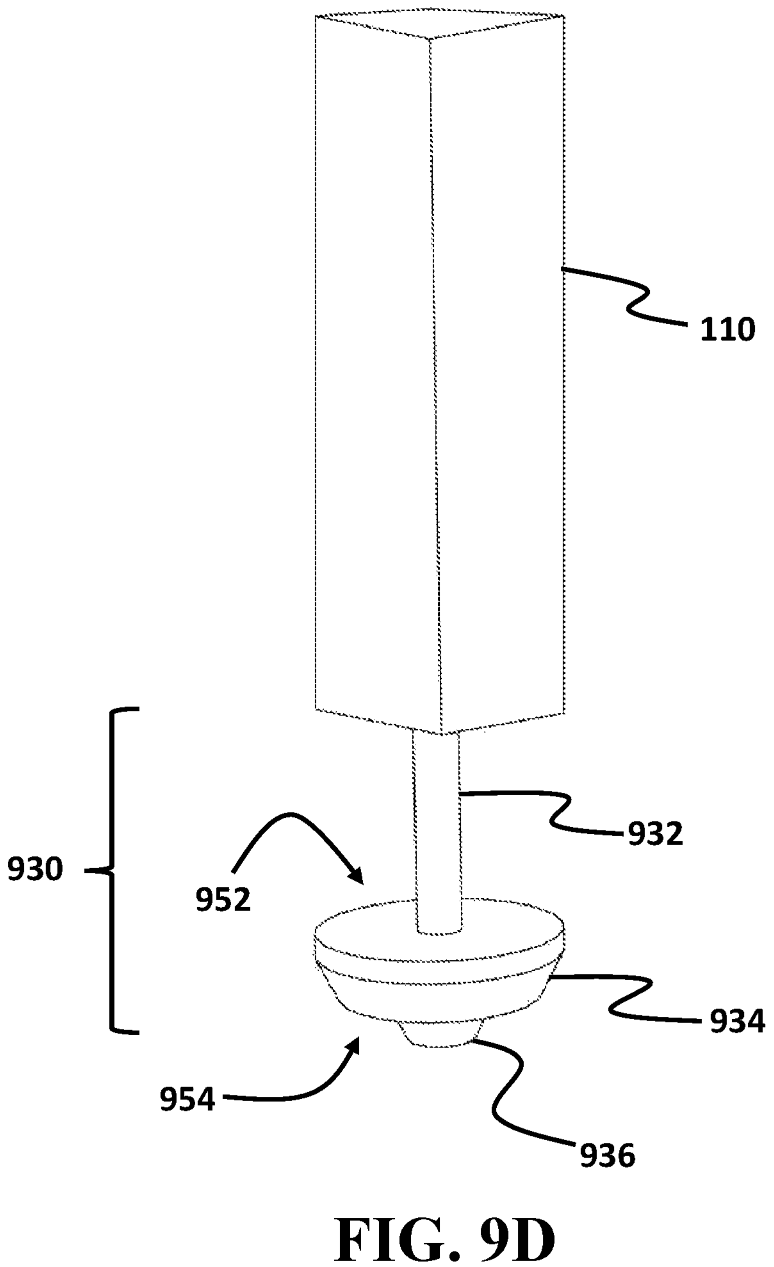
FIG. 9D illustrates a sheep foot compacting device gripped by a mechanical vibratory hammer, consistent with one or more exemplary embodiments of the present disclosure.

FIG. 9D shows a sheep foot compacting device gripped by a mechanical vibratory hammer, consistent with one or more exemplary embodiments of the present disclosure. In an exemplary embodiment, the second hammering device utilized in step 918 of method 900 may be substantially analogous in structure and functionality to a sheep foot compacting device 930 as shown in FIG. 9D.

As shown in FIG. 9D, in an exemplary embodiment, sheep foot compacting device 930 may include a second rod 932, a beveled-shaped element 934, and a reduced conical tip 936. In an exemplary embodiment, second rod 932 may include a first end and a second end. In an exemplary embodiment, second rod 932 may be inserted into mechanical vibratory hammer 150 from the first end of second rod 932. In an exemplary embodiment, beveled-shaped element 934 may include a top end 952 and a bottom end 954. In an exemplary embodiment, beveled-shaped element 934 may be attached from top end 952 of beveled-shaped element 934 to the second end of second rod 932. In an exemplary embodiment, reduced conical tip 936 may be attached to bottom end 954 of beveled-shaped element.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Ends 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A mandrel for forming a cavity at a target location, the mandrel comprising:

- a base part with a cylindrical-shaped structure, the base part positioned at a top end of the mandrel, the base part comprising:
  - a shaft insertion hole on a top surface of the base part, the shaft insertion hole configured to receive a shaft of a mechanical vibratory hammer; and
  - a cavity at the bottom surface of the base part, a diameter of the cavity being ninety percent of a diameter of the base part, a depth of the cavity being 2 millimeters;
- a first middle part comprising a first top surface, a first bottom surface, and a first lateral surface between the first top surface and the first bottom surface, the first top surface attached to a top surface of the cavity, a diameter of the first top surface being 0.9 of the diameter of the cavity, the first middle part and the base part defining a first angle between a main plane of the bottom surface of the base part and a tangential plane of the first lateral surface, the first angle being 135';
- a second middle part with a cylindrical-shaped structure, the second middle part comprising a second top surface and a second bottom surface, the second top surface attached to the first bottom surface, a diameter of the second top surface being equal to a diameter of the first bottom surface, a main longitudinal axis of the second middle part being perpendicular to the main plane of the bottom surface of the base part;
- a third middle part comprising a third top surface, a third bottom surface, and a third lateral surface, the third top surface attached to the second bottom surface, a diameter of the third top surface being equal to a diameter of the second bottom surface, the third lateral surface and the second bottom surface defining a second angle between a main plane of the second bottom surface and a tangential plane of the third lateral surface, the second angle being 135';
- a bore head positioned at a bottom end of the mandrel, a top surface of the bore head attached to the third bottom surface, a diameter of the top surface of the bore head being equal to a diameter of the third bottom surface, the bore head comprising a wedge-shaped tip at a bottom end of the bore head, the wedge-shaped tip configured to tamper through hard rock surfaces, the wedge-shaped tip comprises a first inclined surface and a second inclined surface, a bottom end of the first inclined surface attached to a bottom end of the second inclined surface, the first inclined surface and the second inclined surface defining a wedge angle between a main plane of the first inclined surface and a main plane of the second inclined surface, the wedge angle being 32°;
- a first plurality of diamond-shaped crushing blades attached around the first middle part and the second middle part, each respective diamond-shaped crushing blade from the first plurality of diamond-shaped crushing blades comprising a first edge and a second edge, each diamond-shaped crushing blade from the first plurality of diamond-shaped crushing blades attached at the respective first edge to the first lateral surface of the first middle part and attached at the respective second edge to the second lateral surface of the second middle part; and
- a second plurality of diamond-shaped crushing blades attached around the third middle part and the bore head, each respective diamond-shaped crushing blade from the second plurality of diamond-shaped crushing blades comprising a third edge and a fourth edge, each diamond-shaped crushing blade from the second plurality of diamond-shaped crushing blades attached at the respective third edge to the third lateral surface of the third middle part and attached at the respective fourth edge to the fourth lateral surface of the bore head.

2. A mandrel for forming a cavity at a target location, the mandrel comprising:

- a base part with a cylindrical-shaped structure, the base part positioned at a top end of the mandrel, the base part comprising:
  - a shaft insertion hole on a top surface of the base part, the shaft insertion hole configured to receive a shaft of a mechanical vibratory hammer;
- a first middle part comprising a first top surface, a first bottom surface, and a first lateral surface between the first top surface and the first bottom surface, the first top surface attached to a bottom surface of the base part, the first middle part and the base part defining a first angle between a main plane of the bottom surface of the base part and a tangential plane of the first lateral surface, the first angle in a range between 130° and 150°;
- a second middle part with a cylindrical-shaped structure, the second middle part comprising a second top surface, a second bottom surface, and a second lateral surface, the second top surface attached to the first bottom surface, a main longitudinal axis of the second middle part being perpendicular to the main plane of the bottom surface of the base part;

a third middle part comprising a third top surface, a third bottom surface, and a third lateral surface, the third top surface attached to the second bottom surface, the third lateral surface and the second bottom surface defining a second angle between a main plane of the second bottom surface and a tangential plane of the third lateral surface, the second angle in a range between 130° and 150°;

a bore head positioned at a bottom end of the mandrel, a top surface of the bore head attached to the third bottom surface, the bore head configured to tamper through hard rock surfaces;

a first plurality of diamond-shaped crushing blades attached around the first middle part and the second middle part, each respective diamond-shaped crushing blade from the first plurality of diamond-shaped crushing blades comprising a first edge and a second edge, each diamond-shaped crushing blade from the first plurality of diamond-shaped crushing blades attached at the respective first edge to the first lateral surface of the first middle part and attached at the respective second edge to the second lateral surface of the second middle part; and a second plurality of diamond-shaped crushing blades attached around the third middle part and the bore head, each respective diamond-shaped crushing blade from the second plurality of diamond-shaped crushing blades comprising a third edge and a fourth edge, each diamond-shaped crushing blade from the second plurality of diamond-shaped crushing blades attached at the respective third edge to the third lateral surface of the third middle part and attached at the respective fourth edge to the fourth lateral surface of the bore head.

3. The mandrel of claim 2, wherein the base part comprises a cavity at the bottom surface of the base part, the first top surface attached to a top surface of the cavity.

4. The mandrel of claim 3, wherein:

a diameter of the cavity is ninety percent of a diameter of the base part;

a depth of the cavity is 2 millimeters;

a diameter of the first top surface is ninety percent of the diameter of the cavity;

a diameter of the second top surface is equal to a diameter of the first bottom surface;

a diameter of the third top surface is equal to a diameter of the second bottom surface; and a diameter of the top surface of the bore head is equal to a diameter of the third bottom surface.

5. The mandrel of claim 4, wherein the bore head comprises a wedge-shaped tip at a bottom end of the bore head, the wedge-shaped tip configured to tamper through hard rock surfaces.

6. The mandrel of claim 5, wherein:

the wedge-shaped tip comprises a first inclined surface and a second inclined surface;

a bottom end of the first inclined surface is attached to a bottom end of the second inclined surface;

the first inclined surface and the second inclined surface define a wedge angle between a main plane of the first inclined surface and a main plane of the second inclined surface, the wedge angle in a range between 20° and 45°.

7. The mandrel of claim 6, wherein:

the first angle is 135°;

the second angle is 135°, and the wedge angle is 32°.

8. A mandrel for forming a cavity at a target location, the mandrel comprising:

a base part;

a first middle part;

a second middle part;

a third middle part;

a bore head; and a first plurality of diamond-shaped crushing blades attached around the first middle part and the second middle part, each respective diamond-shaped crushing blade from the first plurality of diamond-shaped crushing blades comprising a first edge and a second edge, each diamond-shaped crushing blade from the first plurality of diamond-shaped crushing blades attached at the respective first edge to the first lateral surface of the first middle part and attached at the respective second edge to the second lateral surface of the second middle part.

9. The mandrel of claim 8, further comprising a second plurality of diamond-shaped crushing blades attached around the third middle part and the bore head, each respective diamond-shaped crushing blade from the second plurality of diamond-shaped crushing blades comprising a third edge and a fourth edge, each diamond-shaped crushing blade from the second plurality of diamond-shaped crushing blades attached at the respective third edge to the third lateral surface of the third middle part and attached at the respective fourth edge to the fourth lateral surface of the bore head.

10. The mandrel of claim 9, wherein:

the base part has a cylindrical-shaped structure;

the base part is positioned at a top end of the mandrel;

the base part comprises a shaft insertion hole on a top surface of the base part; and the shaft insertion hole is configured to receive a shaft of a mechanical vibratory hammer.

11. The mandrel of claim 10, wherein:

the first middle part comprises a first top surface, a first bottom surface, and a first lateral surface between the first top surface and the first bottom surface;

the first top surface is attached to a bottom surface of the base part;

the first middle part and the base part define a first angle between a main plane of the bottom surface of the base part and a tangential plane of the first lateral surface; and the first angle is in a range between 130° and 150°.

12. The mandrel of claim 11, wherein:

the second middle part has a cylindrical-shaped structure;

the second middle part comprises a second top surface, a second bottom surface, and a second lateral surface;

the second top surface is attached to the first bottom surface; and a main longitudinal axis of the second middle part is perpendicular to the main plane of the bottom surface of the base part.

13. The mandrel of claim 12, wherein the third middle part comprises a third top surface, a third bottom surface, and a third lateral surface;

the third top surface is attached to the second bottom surface;

the third lateral surface and the second bottom surface define a second angle between a main plane of the second bottom surface and a tangential plane of the third lateral surface;

the second angle is in a range between 130° and 150°.

14. The mandrel of claim 13, wherein:

the bore head is positioned at a bottom end of the mandrel;

a top surface of the bore head is attached to the third bottom surface; and the bore head is configured to tamper through hard rock surfaces.

15. The mandrel of claim 14, wherein the base part comprises a cavity at the bottom surface of the base part, the first top surface attached to a top surface of the cavity.

16. The mandrel of claim 15, wherein:

a diameter of the cavity is ninety percent of a diameter of the base part;

a depth of the cavity is 2 millimeters;

a diameter of the first top surface is ninety percent of the diameter of the cavity;

a diameter of the second top surface is equal to a diameter of the first bottom surface;

a diameter of the third top surface is equal to a diameter of the second bottom surface; and a diameter of the top surface of the bore head is equal to a diameter of the third bottom surface.

17. The mandrel of claim 16, wherein the bore head comprises a wedge-shaped tip at a bottom end of the bore head, the wedge-shaped tip configured to tamper through hard rock surfaces.

18. The mandrel of claim 17, wherein:

the wedge-shaped tip comprises a first inclined surface and a second inclined surface;

a bottom end of the first inclined surface is attached to a bottom end of the second inclined surface; and the first inclined surface and the second inclined surface define a wedge angle between a main plane of the first inclined surface and a main plane of the second inclined surface, the wedge angle in a range between 20° and 45°.

19. The mandrel of claim 18, wherein:

the first angle is 135°, the second angle is 135°, and the wedge angle is 32°.

* * * * *